UNITED STATES PATENT OFFICE.

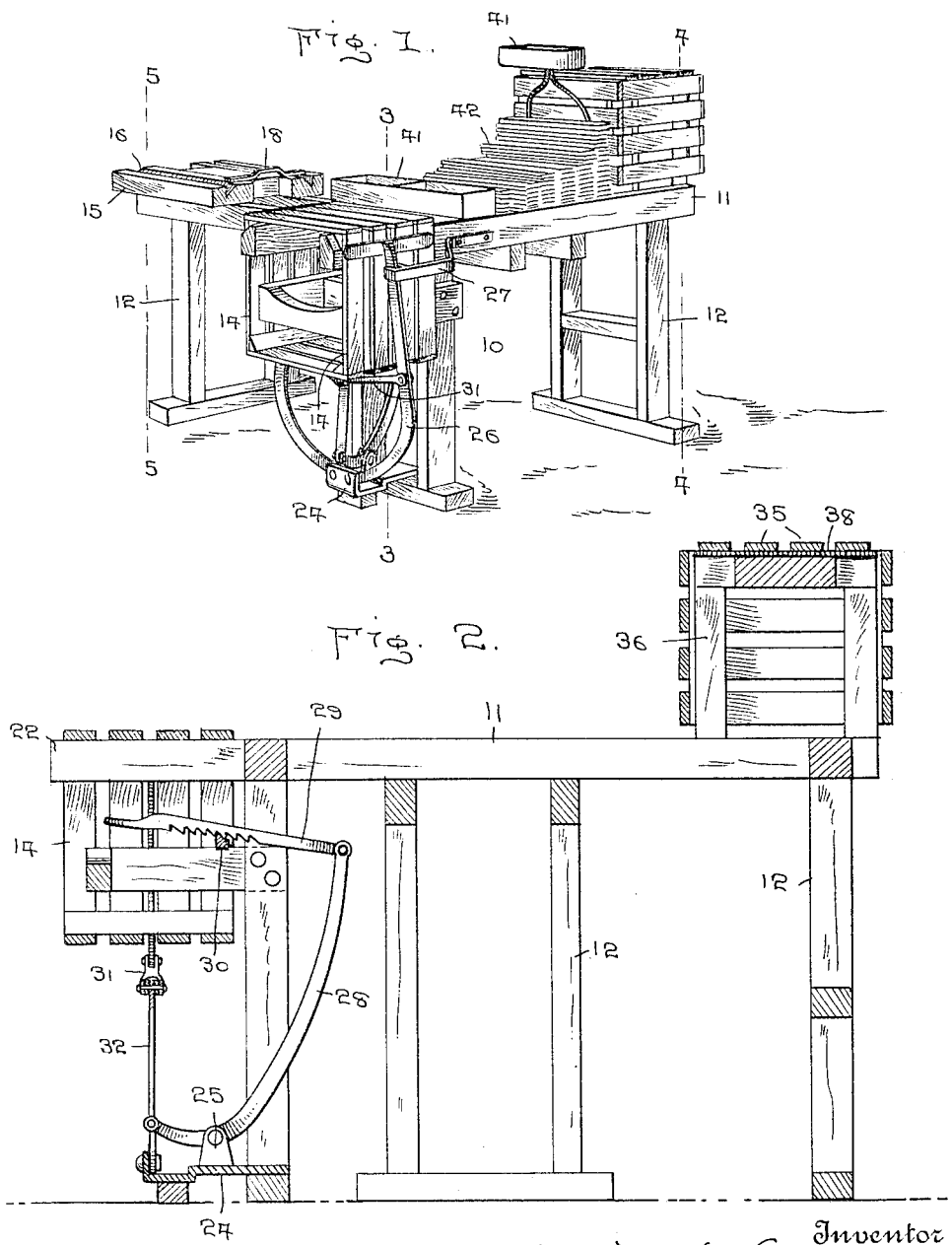

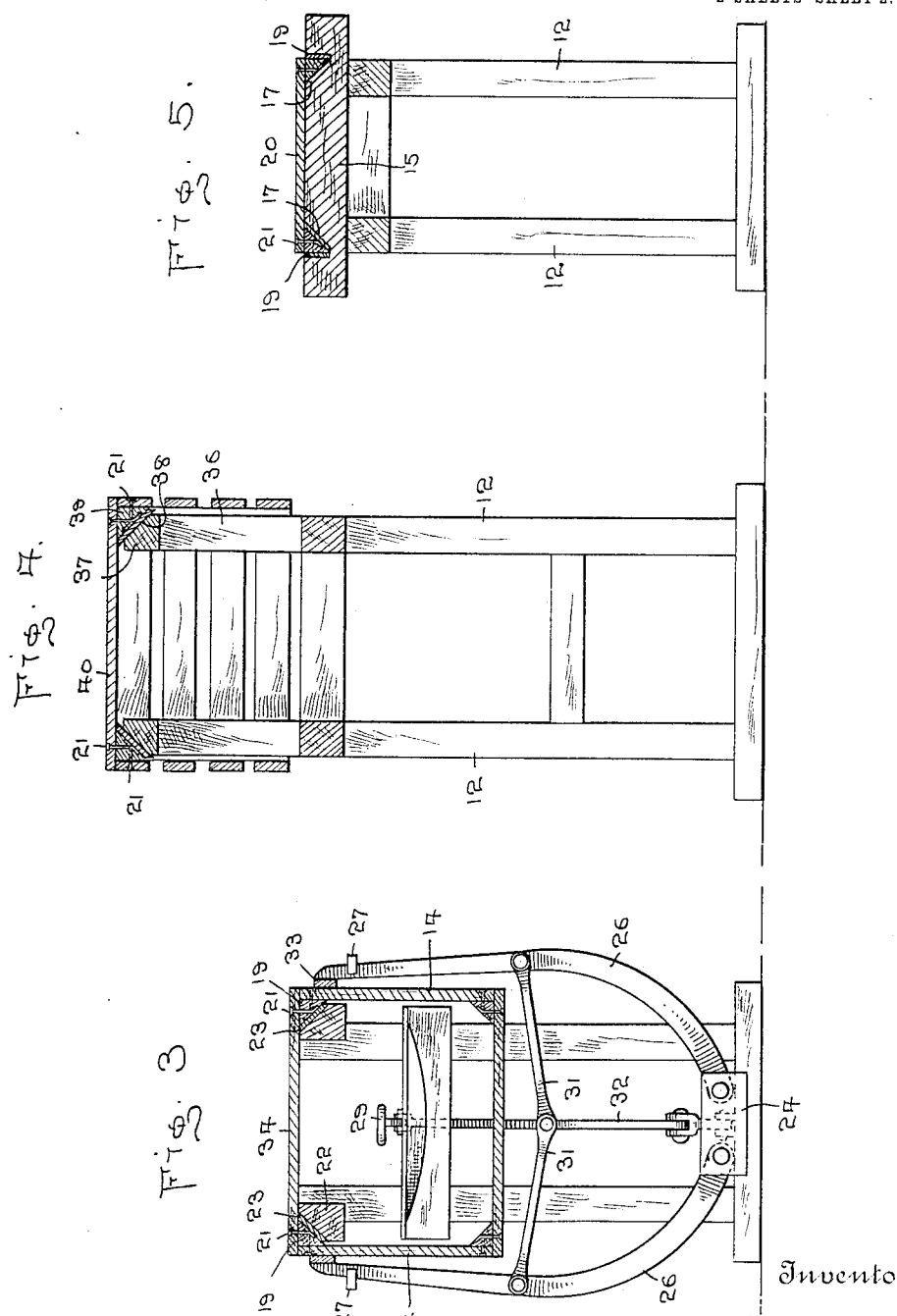

JOEL L. KRETSER, OF PLAINFIELD, WISCONSIN.

BOX-FORMER.

1,120,507. Specification of Letters Patent. Patented Dec. 8, 1914.

Application filed December 3, 1913. Serial No. 804,435.

*To all whom it may concern:*

Be it known that I, the undersigned, JOEL L. KRETSER, citizen of the United States, residing at Plainfield, in the county of Waushara and State of Wisconsin, have invented certain new and useful Improvements in Box-Formers; and I do hereby declare the following to be a full, clear, and exact description of the invention such as will enable others skilled in the art to which it appertains to make and use the same.

The object of this invention is the provision of forms and coöperating clamps for building and nailing boxes or crates adapted to contain vegetables, fruits and the like.

Another object is to provide means for clenching each nail as it is driven into position, thus insuring securely assembled and durable boxes.

In the accompanying drawing wherein is shown an approved embodiment of the invention, Figure 1 represents a perspective view of the complete device, Fig. 2 represents a vertical, longitudinal, sectional view therethrough, Fig. 3 represents a sectional view on the line 3—3 of Fig. 1, Fig. 4 represents a sectional view on the line 4—4 of Fig. 1, and Fig. 5 represents a sectional view on the line 5—5 of Fig. 1.

Referring to the drawing in detail wherein similar reference numerals designate corresponding parts throughout the several views, numeral 10 indicates a frame or bench of suitable shape and construction, and consisting of horizontal members 11 and supporting legs 12.

In constructing the box ends which are designated as a whole in Figs. 1 and 2 by the numeral 14, are first assembled and for this operation a form 15 having V-shaped grooves 16 in the top thereof is provided. The grooves 16 are arranged parallel and a distance apart corresponding to the width of the box, and the walls of said grooves are faced with metallic clenching strips 17. A stop 18 is fixed to the form 15 adjacent one end thereof and is adapted to form a rest for the end of the box being assembled. Corner posts 19 are cut to the desired length and preferably triangular in cross section are positioned one in each of the grooves 16. The boards or strips 20 of the desired material are then positioned over the corner posts 19 and nailed thereto as clearly shown in Fig. 5. The nails 21 are preferably of a length approximate to that shown in Fig. 1 so that the ends thereof will strike and be deflected against the clencher plates 17 thus clenching the strips 20 and the posts 19 together. It will be understood that two ends are provided for each box. The horizontal members or beams 11 are extended at one end of the frame to provide supporting arms 22, and the outer and upper edges are beveled and faced with metallic clenching strips 23.

A bracket 24 is suitably fixed to the lower portion of the frame 10 and is provided with a pair of upstanding ears 25. A pair of oppositely curved arms 26 are pivoted in spaced relation at their lower ends to the bracket 24 and extend upwardly to the supporting arms 23. The upper ends of the arms 26 are movable in suitable guides 27 secured to the beams 11. A curved lever 28 is pivotally mounted between the ears 25 and is provided with a pivoted handle bar 29 at its upper end having a plurality of notches in its under face adapted to selectively receive the tooth 30. The medial portions of the clamping arms 26 are connected by a pair of pivoted links 31. A third link 32 connects the upturned short end of the lever 28 with the pivoted links 31 whereby the clamping arms 26 are moved toward each other when the handle bar 29 is pulled outwardly. The upper ends of the arms 26 are preferably provided with cross pieces 33, which are of substantially the same width as the box gripped thereby—as clearly shown in Fig. 1.

For securing the side strips to the ends of the box, two ends 14 constructed as hereinbefore described, are positioned with their upper ends disposed against the arms 22 in the position shown in Fig. 3. The strips 34 forming one side of the box are then nailed to the corner posts 19, and the nails 21 engaging the clenching plates 23 are turned and clenched. The structure comprising two ends and one side is then reversed and the strips forming the opposite side nailed thereto.

It will be understood that during the operation of nailing the side strips to the corner posts the ends are securely clamped against the supporting arms 22 by the clamping arms 26. To release said arms from clamping engagement with the ends the handle bar 29 is lifted so as to unlock it from the tooth 30 and moved inwardly, thus separating the arms 26.

The final operation in the construction of the box is to attach thereto the bottom strips 35, and for this purpose a suitable form 36 is provided over which the two sides and two ends are positioned as clearly shown in Fig. 1. The end pieces 37 of the form 36 are beveled and faced with clenching strips 38 adapted to receive the bottom corner posts 39, to which are nailed the bottom board or strips 40 constituting the bottom of the box, preferably the bottom strips of the ends are also nailed to the bottom corner posts 39. During the setting of the last mentioned nails the same are clenched by the clenching strips 38.

Suitable receptacles 41 are preferably provided on the frame 10 and are adapted to contain nails for nailing the parts of the boxes together. Space is also preferably provided on the frame for holding the stock of strips 42 from which the boxes are formed.

What I claim is:

1. A box former including a bench, legs for said bench, lateral continuations of the sides of said bench, said continuations being adapted to support a box in the process of assembling, a bracket secured to one of said legs, clamps pivotally secured to said bracket, means for controlling the movement of said clamps simultaneously and cross braces secured to the upper extremities of said clamps and adapted to extend throughout the width of the box being assembled and to removably grip the same.

2. A box former including a bench, lateral continuations of the sides of said bench, said continuations being adapted to support a box being assembled, pivotal clamping members adapted to coact with said continuations in holding said box thereon, links connecting said pivoted member, a curved lever pivotally connected to said links, means connected to said lever whereby a substantially horizontal pull clamps said pivoted members, and braces secured to the upper extremities of said pivoted members and adapted to extend the whole width of the box to be held and to removably grip the same.

In testimony whereof I have signed my name to this specification in the presence of two subscribing witnesses.

JOEL L. KRETSER.

Witnesses:
 Roy L. Thompson,
 Leslie Jones.